J. C. BURROUGHS.
Horse-Boot.

No. 220,217.  Patented Oct. 7, 1879.

Witnesses.
A. Ruppert,
James H. Lange.

Joseph C. Burroughs.
Inventor.
per Edson Brothers
Attorneys

UNITED STATES PATENT OFFICE.

JOSEPH C. BURROUGHS, OF CLINTON, MICHIGAN.

IMPROVEMENT IN HORSE-BOOTS.

Specification forming part of Letters Patent No. 220,217, dated October 7, 1879; application filed August 19, 1879.

*To all whom it may concern:*

Be it known that I, JOSEPH C. BURROUGHS, of Clinton, in the county of Lenawee and State of Michigan, have invented certain new and useful Improvements in Horse-Boots; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1:
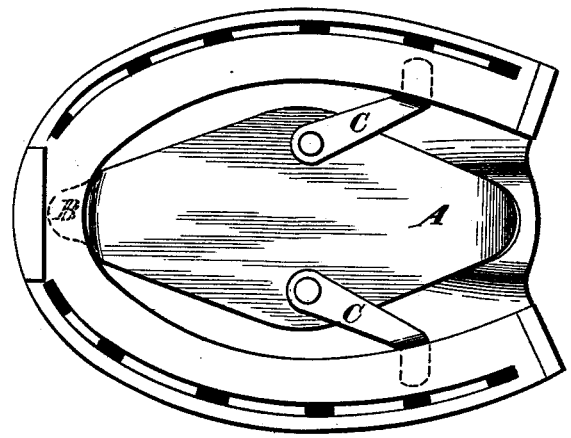
Figure 2:
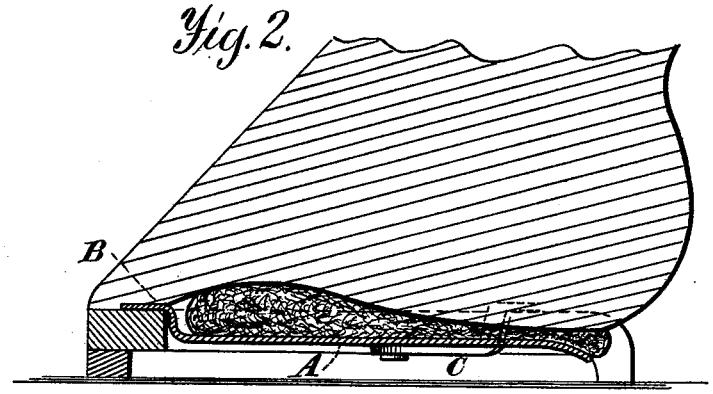
Figure 3:
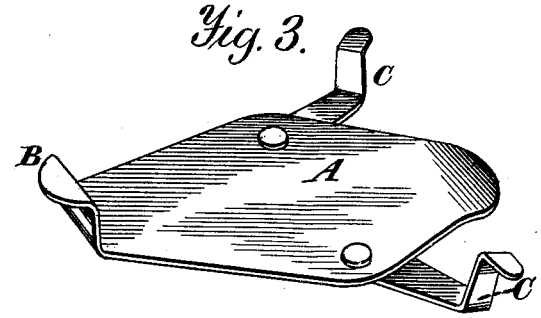

Figure 1 is a plan view, showing my device for holding a moistened or damp sponge or plaster applied to a horse's hoof and shoe thereon. Fig. 2 is a vertical section of the same, and Fig. 3 is a perspective view of my device.

This invention has relation to certain improvements in devices for holding a sponge or plaster to a horse's hoof; and it consists of a plate with its forward or one edge adapted to fit on the shoe, while its sides are provided with pivoted or hinged bent arms for its further attachment to the shoe, substantially as hereinafter more fully set forth.

A indicates a plate, which is preferably of a diamond shape, though this is non-essential, as any other shape will equally serve the purpose of this plate, which is to hold a moistened sponge or plaster to a horse's hoof or foot when sore or inflamed.

The forward edge of the plate A is bent upwardly and outwardly, forming a right-angled extension, B, to provide, as well as a chamber or cavity under the horse's foot for the reception and to hold the moistened sponge or plaster, as seen in Fig. 2, a means for the attachment of that edge or end of the plate between the hoof or foot and the shoe, as clearly seen in the same figure and in dotted lines in Fig. 1. This attachment is effected by introducing the horizontal part of the bent or angular forward edge, B, of the plate between the horse's hoof or foot and shoe, directly in rear of the toe-piece. This plate is provided at its sides, at a point more or less in rear or in front of its center, with pivoted or hinged bent arms C C, adapted to permit of their insertion in between the foot and shoe, near the heel, as clearly seen in dotted lines in Figs. 1 and 2. By moving these arms outwardly, after securing the forward end of the plate as above stated, with their extreme bent ends standing slightly above the shoe until said ends rest on the shoe, the pressure of the compressed sponge or poultice on the plate will securely fasten or hold the device with the moistened sponge or poultice upon the horse's foot.

To remove the device it is only necessary to withdraw the arms from contact with the shoe and slip the plate rearwardly, when its forward end will be withdrawn from between the shoe and foot, and be thus freed entirely from the foot with its sponge or poultice or plaster.

The rear end of the plate is curved or bent downwardly slightly, as at $a$, to prevent its interference with the frog of the foot.

What I claim as new, and desire to secure by Letters Patent, is—

1. The plate A, with its forward edge or end adapted to rest on the shoe, so as to provide a cavity or space between the plate and under side of the foot, and provided at its sides with pivoted arms, also adapted to rest on the shoe near the heel of the foot, substantially as and for the purpose set forth.

2. The combination, with the plate A, with its forward end or edge provided with a right-angled extension, B, of the pivoted or hinged right-angled arms C, substantially as and for the purpose specified.

In testimony that I claim the foregoing as my own I affix my signature in presence of two witnesses.

JOSEPH C. BURROUGHS.

Witnesses:
    E. G. COOK,
    H. REYNOLDS.